Patented Feb. 28, 1933

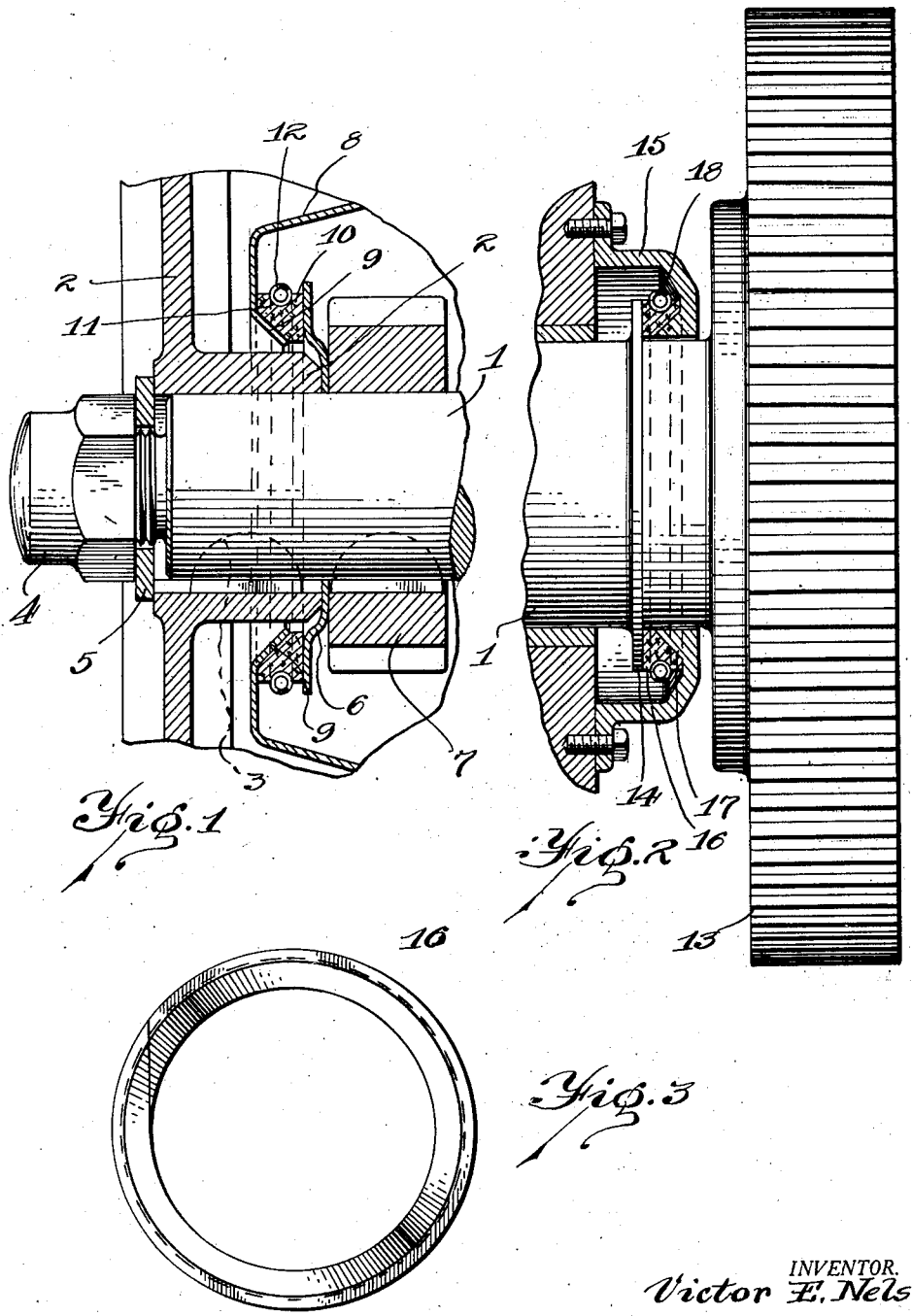

1,899,630

UNITED STATES PATENT OFFICE

VICTOR E. NELSON, OF PONTIAC, MICHIGAN, ASSIGNOR TO UNIVERSAL OIL SEAL COMPANY, OF PONTIAC, MICHIGAN, A CORPORATION OF MICHIGAN

OIL RETAINING PACKING FOR RODS AND SHAFTS

Application filed December 14, 1928. Serial No. 326,099.

This invention relates to packing rings and the object of the invention is to provide in conjunction with an enclosing housing, a packing ring of wedge shape in cross section and provided with a coiled spring about the outer periphery adapted to urge the packing ring into packing engagement.

Another object of the invention is to provide a support for the packing ring in which one support is provided with an angular face and the other is provided with a flat face, pressure being applied to the exterior of the packing ring to force it into engagement with the angular face and the angular face forcing the ring into engagement with the flat face so that both faces are properly packed.

Another object of the invention is to provide a packing ring of the character described adapted to cling to the stationary angular face and to pack the flat face which is movable in relation thereto. More specifically, the object of the invention is to provide a packing for rods and shafts that includes a stationary housing enclosing the packing preventing oil being thrown by centrifugal action from the shaft bearing to about adjacent parts of the mechanism and providing a receptacle like element in which such discharged oil may accumulate.

These objects and the several novel features of the invention are hereinafter more fully described and claimed and the preferred form of construction by which these objects are attained is shown in the accompanying drawing in which Fig. 1 is a section through a packing with which a solid packing ring is used.

Fig. 2 is a section through a packing with which a split packing ring is used.

Fig. 3 is an elevation of the split packing ring.

The section shown in Fig. 1 is a section taken at the front end of an internal combustion engine and shows the forward end of the crank shaft 1 to which the fan belt pulley 2 is secured by the key 3. A nut 4 is threaded onto the forward end of the crank shaft 1 and engages a washer 5 to hold the fan belt pulley thereon. An annular sheet metal plate 6 is bindingly secured between the fan belt pulley hub 2 and the gear 7 which are both secured to the crank shaft 1 so that the member 6 rotates with the crank shaft. A sheet metal housing 8 is secured to the forward end of the engine and covers the end of the engine so that any oil leakage about the crank shaft accumulates in this housing. This sheet metal housing 8 is provided with an inwardly extending angular flange 9 which extends about the fan belt pulley hub 2. The packing ring 10 is preferably made of compressed particles of cork though other suitable material may be used. This ring is provided with an angular face seating on the angular flange 9 of the housing and is also provided with a flat face engaging the companion flat face of the sheet metal member 6. The packing ring is provided with a semi-circular groove 11 on its outer periphery and a coiled spring 12 is positioned in this groove and tends to contract the ring. This forces the ring into engagement with the faces to be packed and as the ring is fairly flexible it closely fits the companion faces. The ring normally tends to cling to the stationary flange 9 of the housing 8 while the member 6 rotates in relation to the ring. With this arrangement no oil can seep along the shaft as it tends to be thrown into the housing by centrifugal force and the packing ring prevents any possibility of leakage between the stationary housing and the rotatable sheet metal plate 6.

In Fig. 2 the rear end of the crank shaft 1 is shown to which the fly wheel 13 is secured. In this case the crank shaft is provided with a flange or collar 14 and a small housing 15 is secured to the engine about the bearing for the crank shaft. The packing ring 16 is split as shown in Fig. 3 in order to allow the ring to be placed behind the collar 14 on the angular face 17 of the housing, the only difference between the packing ring shown in Fig. 2 and that shown in Fig. 1 being that the ring is split as shown in Fig. 3. In the form shown in Fig. 2 the packing ring 16 remains stationary with the housing 15 and packs the flat face of the collar 14 with which it is used. In either case the compression of the ring by the spring 12 or 18 forces the packing ring down the angular face of the housing and into tighter engagement with the flat face which it packs though the ring is free to rotate with the plate 6 or collar 14 or remain stationary with its companion stationary angular face.

From the foregoing description it becomes evident that the device is very simple and efficient in operation, is composed of few parts and is of consequent low manufacturing cost, will not easily wear out and provides a device which accomplishes the objects described.

Having thus fully described my invention, its utility and mode of operation, what I claim and desire to secure by Letters Patent of the United States is—

1. In a packing ring, a stationary housing having an annular beveled face, a shaft rotatable in the housing, a flanged member secured to the shaft within the housing and in spaced relation with the beveled face thereof, a compressible packing ring having a beveled face fitting the beveled face of the housing and a flat face fitting the companion face of the flanged member, the packing ring being provided with an annular groove in its outer periphery and a coiled spring positioned in the annular groove and compressing the packing ring into engagement with the companion faces of the housing and flanged member.

2. In a packing ring, a rotatable shaft, a flanged member rotatable with the shaft, a stationary housing having an annular beveled face in spaced substantially concentric relation with the shaft and in spaced relation with the flanged member, a compressible packing ring having a beveled face fitting the beveled face of the housing and a flat face fitting the companion face of the flanged member, and a spring extending about the periphery of the packing ring and compressing the packing ring into engagement with the companion faces of the housing and flanged member, said housing enclosing the flanged member and packing ring and providing a receptacle for lubricant.

3. In a packing ring, a rotatable shaft, a flanged member rotatable with the shaft, a stationary housing member having an opening greater than the diameter of the shaft through which the shaft extends, one of said members being provided with a flat face and the other being provided with an annular beveled face, a compressible packing ring fitting the said faces of the said members, and a spring extending about the periphery of the packing ring and compressing the packing ring into engagement with the said faces, said housing enclosing the flanged member and packing ring substantially as and for the purpose described.

4. In a packing ring, a stationary housing having an annular beveled face, a shaft having a bearing and a portion extending beyond the bearing into the housing, a flanged member within the housing rotatable with the shaft, a compressible packing ring fitting the beveled face of the stationary housing and companion face provided on the flanged member, and a spring compressing the packing ring into engagement with the flanged member and the beveled face of the housing, the inner diameter of the packing ring being greater than the outer diameter of the shaft.

5. In a packing ring, a stationary housing having an annular beveled face, a shaft having a bearing and extending into the housing, a flanged member within the housing rotatable with the shaft, a compressible packing ring fitting the beveled face of the stationary housing and companion face on the flanged member and a spring compressing the packing ring between the flanged member and the beveled face of the housing, said housing providing an oil retaining case enclosing the flanged member and packing ring.

In testimony whereof I sign this specification.

VICTOR E. NELSON.